(12) United States Patent
Fukuda et al.

(10) Patent No.: US 12,125,176 B2
(45) Date of Patent: Oct. 22, 2024

(54) INSPECTION APPARATUS AND MEASUREMENT APPARATUS

(71) Applicant: Hitachi High-Tech Corporation, Tokyo (JP)

(72) Inventors: Kosuke Fukuda, Tokyo (JP); Masayoshi Ishikawa, Tokyo (JP); Yasuhiro Yoshida, Tokyo (JP); Hiroyuki Shindo, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 342 days.

(21) Appl. No.: 17/749,331

(22) Filed: May 20, 2022

(65) Prior Publication Data
US 2022/0414833 A1    Dec. 29, 2022

(30) Foreign Application Priority Data

Jun. 29, 2021  (JP) .................................. 2021-107415

(51) Int. Cl.
| | |
|---|---|
| *G06T 5/70* | (2024.01) |
| *G06T 3/40* | (2024.01) |
| *G06T 7/00* | (2017.01) |
| *G06T 7/62* | (2017.01) |

(52) U.S. Cl.
CPC .................. *G06T 5/70* (2024.01); *G06T 3/40* (2013.01); *G06T 7/001* (2013.01); *G06T 7/62* (2017.01); *G06T 2207/10061* (2013.01); *G06T 2207/20081* (2013.01); *G06T 2207/30148* (2013.01); *G06T 2207/30168* (2013.01)

(58) Field of Classification Search
CPC ......... G06T 3/4076; G06T 7/30; H04N 19/63; H04N 19/176
See application file for complete search history.

(56) References Cited

U.S. PATENT DOCUMENTS

| | | | | |
|---|---|---|---|---|
| 6,404,853 | B1* | 6/2002 | Odogba | A61B 6/00 378/207 |
| 6,714,317 | B2* | 3/2004 | Lu | H04N 1/00384 358/475 |
| 7,180,072 | B2* | 2/2007 | Persi | G06T 7/33 250/370.08 |

(Continued)

FOREIGN PATENT DOCUMENTS

| | | |
|---|---|---|
| CN | 110490878 A | 11/2019 |
| JP | 4239088 B2 | 3/2009 |

OTHER PUBLICATIONS

Taiwanese Office Action received in corresponding Taiwanese Application No. 111123426 dated Sep. 12, 2023.

*Primary Examiner* — Yosef Kassa
(74) *Attorney, Agent, or Firm* — MATTINGLY & MALUR, PC

(57) ABSTRACT

An inspection apparatus includes an image distortion estimation unit that estimates a distortion amount between a reference image and an inspection image, an image distortion correction unit that corrects the inspection image and/or the reference image using an estimated distortion amount, and an inspection unit that performs inspection using a corrected inspection image and the reference image or the inspection image and a corrected reference image. The image distortion estimation unit estimates a distortion amount in which only distortion occurring in an entire image can be corrected by adjustment of a correction condition.

14 Claims, 12 Drawing Sheets

(56) References Cited

U.S. PATENT DOCUMENTS

| | | | | |
|---|---|---|---|---|
| 7,583,832 B2 * | 9/2009 | Okuda | .................... | G06T 7/001 |
| | | | | 348/125 |
| 7,593,020 B2 * | 9/2009 | Zitnick, III | ............ | G06T 11/60 |
| | | | | 345/592 |
| 8,213,746 B2 * | 7/2012 | Volovelsky | ........... | G06T 3/4076 |
| | | | | 345/698 |
| 2022/0108452 A1 | 4/2022 | Xiang et al. | | |

\* cited by examiner

INSPECTION APPARATUS AND MEASUREMENT APPARATUS

CLAIM OF PRIORITY

The present application claims priority from Japanese Patent application serial No. 2021-107415, filed on Jun. 29, 2021, the content of which is hereby incorporated by reference into this application.

BACKGROUND OF THE INVENTION

1. Field of the Invention

The present invention relates to an image processing technique for processing image data, and in particular, relates to an inspection apparatus and a measurement apparatus that are suitable for inspection or measurement using image data.

2. Description of the Related Art

For evaluation such as defect inspection of a semiconductor circuit, a method of comparing an inspection image with a reference image is adopted. As a reference image, design data of a sample that is an evaluation target object or a dimension measurement target, an image obtained by simulating a captured image by machine learning or the like using design data, an image statistic indicating, for each pixel, a distribution of luminance values that can be taken by a captured image of a sample produced from the same design data, and another region of a captured image having the same pattern as the sample are used.

In defect inspection and dimension measurement, there is a case where a captured image generated by an apparatus has an image distortion caused by capturing, and a local positional displacement occurs between a reference image and an inspection image. In this case, in a region with image distortion, an originally normal point is determined as a defect, or a measurement error increases. JP 4239088 B2 discloses that by estimating a shift amount that minimizes an error between two images by sum of squared difference (SSD) matching, a positional displacement is eliminated and erroneous detection of a defect is suppressed.

SUMMARY OF THE INVENTION

The positional displacement generated between a reference image and an inspection image includes those due to image distortion and those due to an abnormality such as a defect. In order to apply an inspection image with image distortion to evaluation such as defect inspection, it is necessary to remove only the positional displacement due to image drawing reduced print image distortion.

In JP 4239088 B2, position adaptation is performed using, a distortion amount, a shift amount that minimizes a difference between an inspection image and a reference image obtained for the entire image and each partial region. However, since the positional displacement due to abnormality such as defect is not taken into consideration, over-adaptation to the inspection image having abnormality such as the defect can occur. As a result, there is a concern about an undetected problem that an originally abnormal region is regarded as normal.

Therefore, the present invention provides an inspection apparatus and a measurement apparatus that are capable of improving the accuracy of evaluation and measurement by a distortion correction technique adapted to a region excluding an abnormal portion such as a defect in evaluation such as defect inspection and dimension measurement.

In order to solve the above problem, an inspection apparatus according to the present invention is an inspection apparatus that inspects an inspection image by comparison with a reference image, the inspection apparatus including: an image distortion estimation unit that estimates a distortion amount between the reference image and the inspection image; an image distortion correction unit that corrects an inspection image and/or a reference image using an estimated distortion amount; and an inspection unit that performs inspection using a corrected inspection image and a reference image or an inspection image and a corrected reference image, in which the image distortion estimation unit estimates a distortion amount in which only distortion occurring in an entire image can be corrected by adjustment of a correction condition.

A measurement apparatus according to the present invention is a measurement apparatus that measures a length of a sample using an inspection image, the measurement apparatus including: an image distortion estimation unit that estimates a distortion amount between a reference image and the inspection image based on the reference image and the inspection image; an image distortion correction unit that corrects an inspection image using an estimated distortion amount; and a measurement unit that measures a length of a sample using a corrected inspection image, in which the image distortion estimation unit estimates a distortion amount in which only distortion occurring in an entire image can be corrected by adjustment of a correction condition.

According to the present invention, it is possible to provide an inspection apparatus and a measurement apparatus that are capable of improving the accuracy of evaluation and measurement by a distortion correction technique adapted to a region excluding an abnormal portion such as a defect in evaluation such as defect inspection and dimension measurement.

Problems, configurations, and effects other than those described above will be made clear by the description of the following embodiment.

DESCRIPTION OF THE PREFERRED EMBODIMENTS

The inspection apparatus and the measurement apparatus exemplified in the present description relate to an inspection apparatus and a measurement apparatus for estimating only distortion occurring in the entire image between a reference image and an inspection image, making it possible to perform correction excluding positional displacement due to an abnormal portion such as a defect, and improving inspection and measurement performance.

In the present description, a semiconductor circuit captured by a scanning electron microscope (SEM) is exemplified as an inspection target sample, but the present invention is not limited to this. Needless to say, the present invention is also applicable to an image captured by another image-capturing apparatus.

Embodiments of the present invention will be described below with reference to the drawings.

First Embodiment

Figure 1:
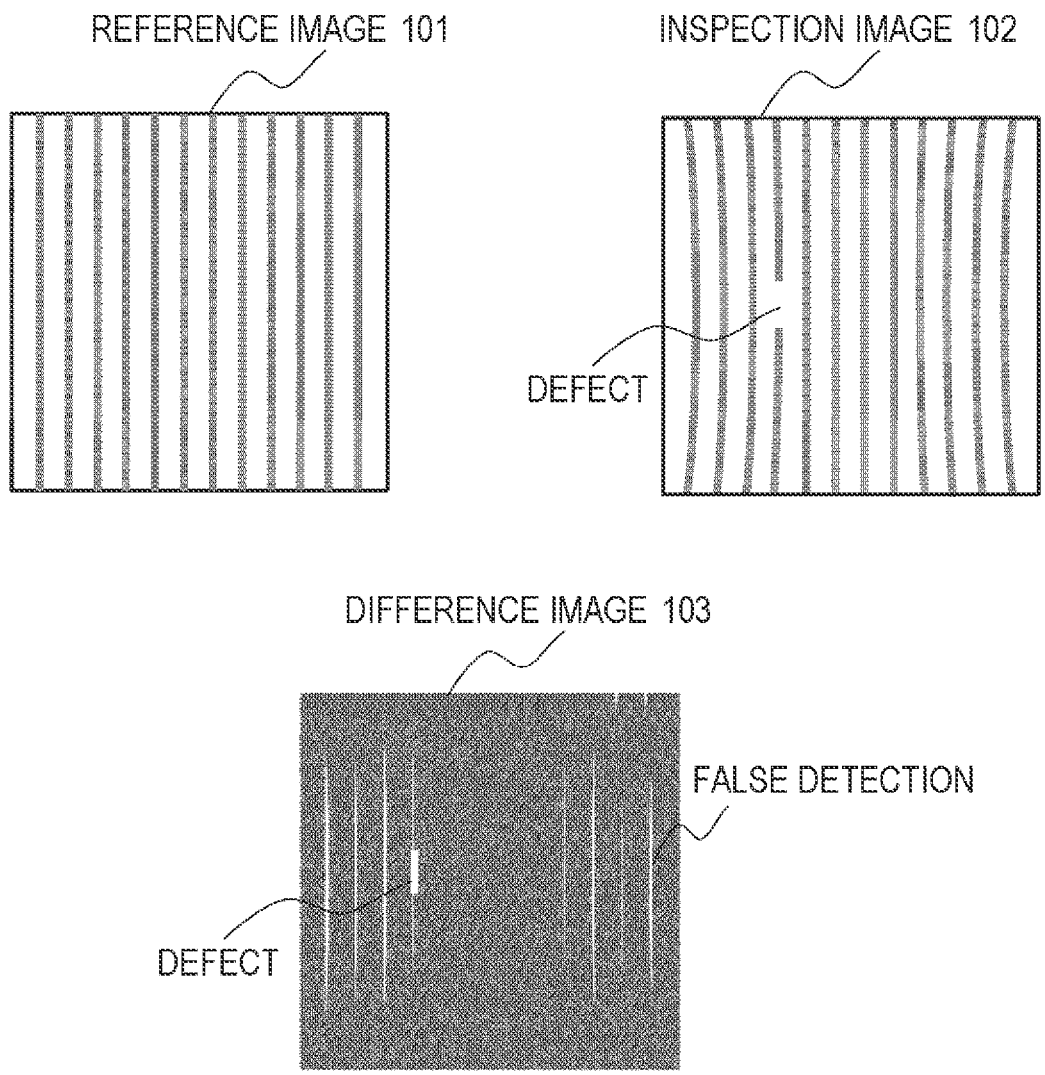
FIG. 1 is a diagram illustrating an example of a reference image and an inspection image having image distortion.

FIG. 1 is a diagram illustrating an example of a reference image and an inspection image having image distortion. As illustrated in FIG. 1, a reference image 101 is an image that coincides with an inspection image 102 except for noise when there is no defect or image distortion, and examples thereof include an image obtained from design data of a sample, a captured image generated by machine learning or the like using design data, an image of another region having a pattern similar to an inspection image, and an image statistic in which distribution of possible luminance values of a captured image predicted from design data is obtained for each pixel on an assumption of Gaussian distribution. The inspection image 102 is a captured image of a sample produced using design data similar to that of the reference image 101. The presence or absence of defect on the inspection image 102 is determined by evaluating a difference between this reference image 101 and the inspection image 102. In a difference image 103 between the reference image 101 and the inspection image 102, a region having a high luminance value is detected as an abnormal portion such as a defect.

In a case where the inspection image 102 has image distortion, a difference occurs between the reference image 101 and the inspection image 102 due to positional displacement caused by image distortion occurring in the entire image, thereby generating erroneous detection in which a place that is not originally a defect is erroneously determined as a defect.

Here, the reference image 101 of FIG. 1 is an example without image distortion, but as described above, the reference image 101 may be a captured image of a sample produced using design data similar to that of the inspection image 102, and may have image distortion. In that case, the inspection apparatus of the present embodiment estimates positional displacement due to image distortion between the reference image 101 and the inspection image 102. The inspection image 102 of FIG. 1 illustrates an example of radial distortion as image distortion, but the present invention is not limited to this. Image distortion may be, for example, any distortion such as translational displacement, rotational displacement, and a wavy displacement where wiring is wavy.

Figure 3:
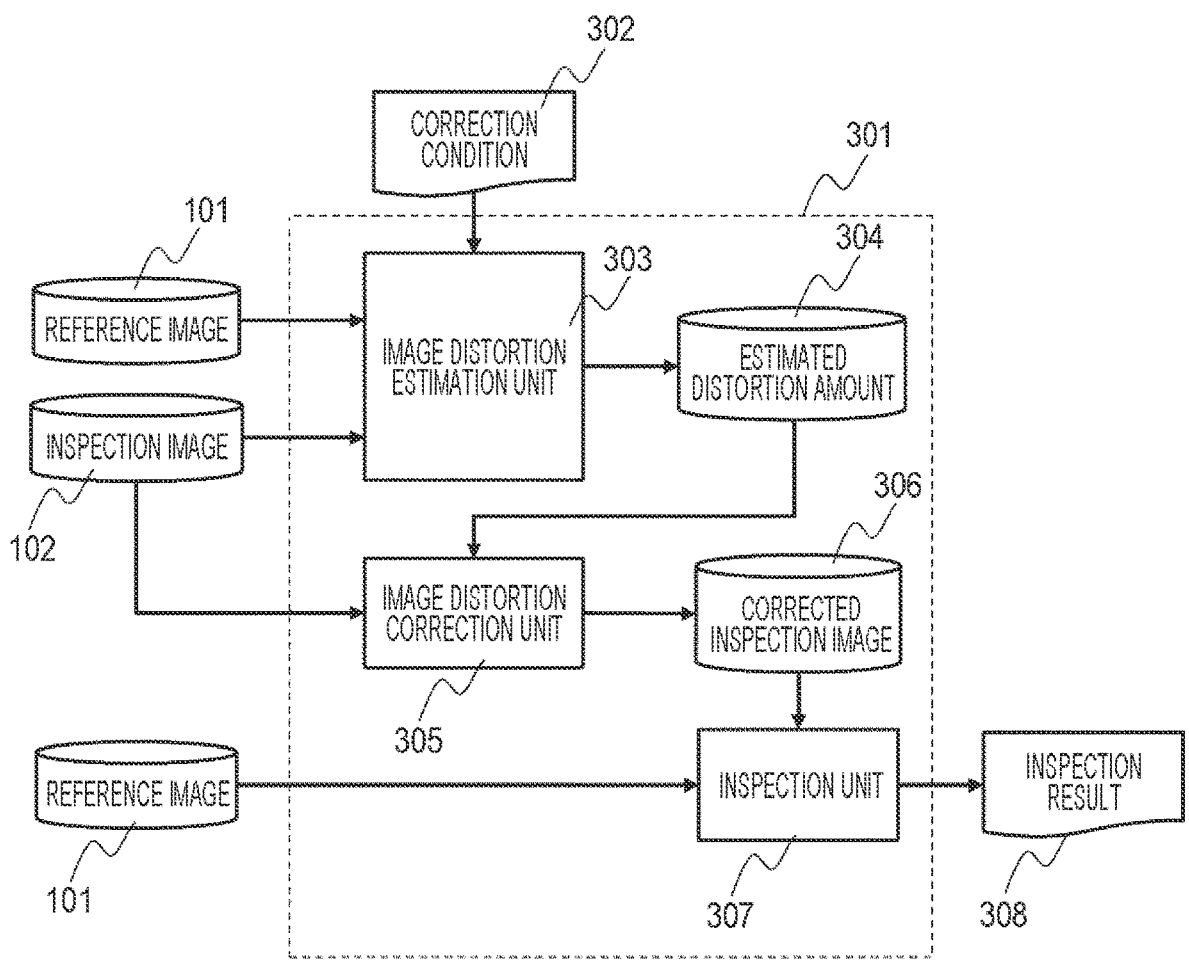
FIG. 3 is a functional block diagram illustrating an overall configuration example of an inspection apparatus of a first embodiment according to one embodiment of the present invention.

FIG. 3 is a functional block diagram illustrating an overall configuration example of the inspection apparatus of the first embodiment according to one embodiment of the present invention. Note that an inspection apparatus 301 according to the present embodiment performs inspection by comparing the reference image 101 and the inspection image 102.

As illustrated in FIG. 3, the inspection apparatus 301 includes an image distortion estimation unit 303, an estimated distortion amount 304, an image distortion correction unit 305, a corrected inspection image 306, and an inspection unit 307. Here, the image distortion estimation unit 303, the image distortion correction unit 305, and the inspection unit 307 are implemented by, for example, a processor such as a CPU (not illustrated), a ROM that stores various programs, a RAM that temporarily enables data in an arithmetic process, and a storage apparatus such as an external storage apparatus, and the processor such as the CPU reads and executes the various programs stored in the ROM, and stores an arithmetic result that is an execution result into the RAM or the external storage apparatus.

The image distortion estimation unit 303 receives the reference image 101, the inspection image 102, and a correction condition 302, estimates a positional displacement due to image distortion between the reference image 101 and the inspection image 102, and outputs the estimated distortion amount 304. This estimated distortion amount 304 is calculated such that the similarity between the reference image 101 and the inspection image 102 increases while satisfying the constraint condition defined by the correction condition 302 described later. The estimated distortion amount is represented by a two-dimensional vector amount (dx, dy) corresponding to each pixel of the reference image 101 or the inspection image 102, and an image similar to the reference image 101 is obtained by moving each pixel of the inspection image 102 by the corresponding vector amount. Here, the vector amount has been described as a form of the estimated distortion amount 304. However, in a case of assuming distortion amount that can be formulated such as a rotational displacement or a translational displacement, a parameter such as a rotational angle or a translational displacement amount may be used. The similarity between the reference image 101 and the inspection image 102 is increased by reducing the error of the luminance value, and by increasing the likelihood of the distribution of the inspection image 102 and the reference image 101 when the reference image 101 is the image statistic.

With the estimated distortion amount 304 output by the image distortion estimation unit 303 and the inspection image 102 as input, the image distortion correction unit 305 corrects the inspection image 102 by the estimated distortion amount 304 and outputs the corrected inspection image 306.

By comparing the corrected inspection image 306 with the reference image 101, the inspection unit 307 inspects an abnormal portion such as a defect. When the image distortion correction unit 305 corrects the reference image 101, the inspection unit 307 performs inspection by comparing the corrected reference image with the inspection image 102.

Figure 4:
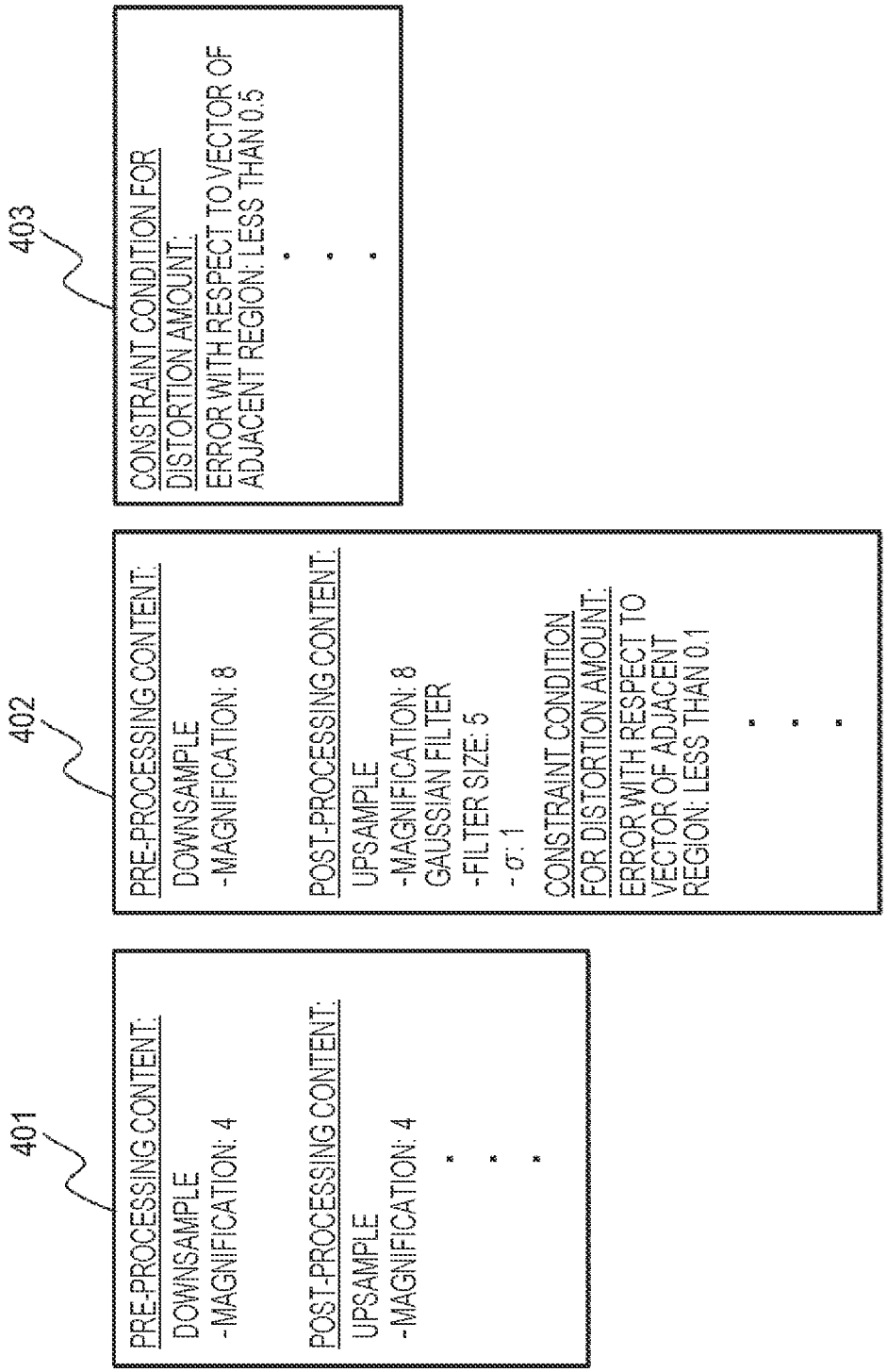
FIG. 4 is a diagram illustrating an example of a correction condition illustrated in FIG. 3.

FIG. 4 is a diagram illustrating an example of the correction condition 302 illustrated in FIG. 3, and is a diagram illustrating an example of a variation of the correction condition 302 to be input to the image distortion estimation unit 303. An object of the correction condition 302 is to enable the image distortion estimation unit 303 to estimate a distortion amount capable of correcting only a positional displacement due to distortion occurring in the entire image without considering local and high-frequency image features by adjusting processing content and setting parameters. As the correction condition 302, pre-processing for the inspection image 102 and the reference image 101 from which local and high-frequency image features can be removed, and constraint conditions and post-processing for setting constraints on the estimated distortion amount 304 so as not to correct local and high-frequency positional displacement are defined.

For example, as in a correction condition 401, downsample for reducing the image to, for example, ¼ or upsample for restoring the estimated distortion amount to the original image size can be defined as the pre-processing. As in a correction condition 402, in addition to the downsample magnification of the pre-processing and the upsample magnification for restoring the estimated distortion amount to the original image size, the filter size and the standard deviation of the Gaussian filter for smoothing the estimated distortion amount are defined, and the absolute error of the vector of the predicted distortion amount in the adjacent region can be defined to be, for example, within 0.1 as a constraint condition for the evaluation criteria in step S603 in FIG. 6 described later by the image distortion estimation unit. Furthermore, as in a correction condition 403, it can be defined without performing pre-processing and post-processing.

The correction conditions 401, 402, and 403 are examples, and the values of the processing content and setting parameters are determined according to the circuit size and the defect size of the inspection target sample, and thus are not limited to them. For example, a smoothing filter such as a Gaussian filter and a moving average filter may be applied to the inspection image as pre-processing, and a smoothing filter, downsample, and upsample may be used together for pre-processing and post-processing. Constraint conditions on the distortion amount include reduction of a variance value in a region near the estimated distortion amount.

Figure 5:
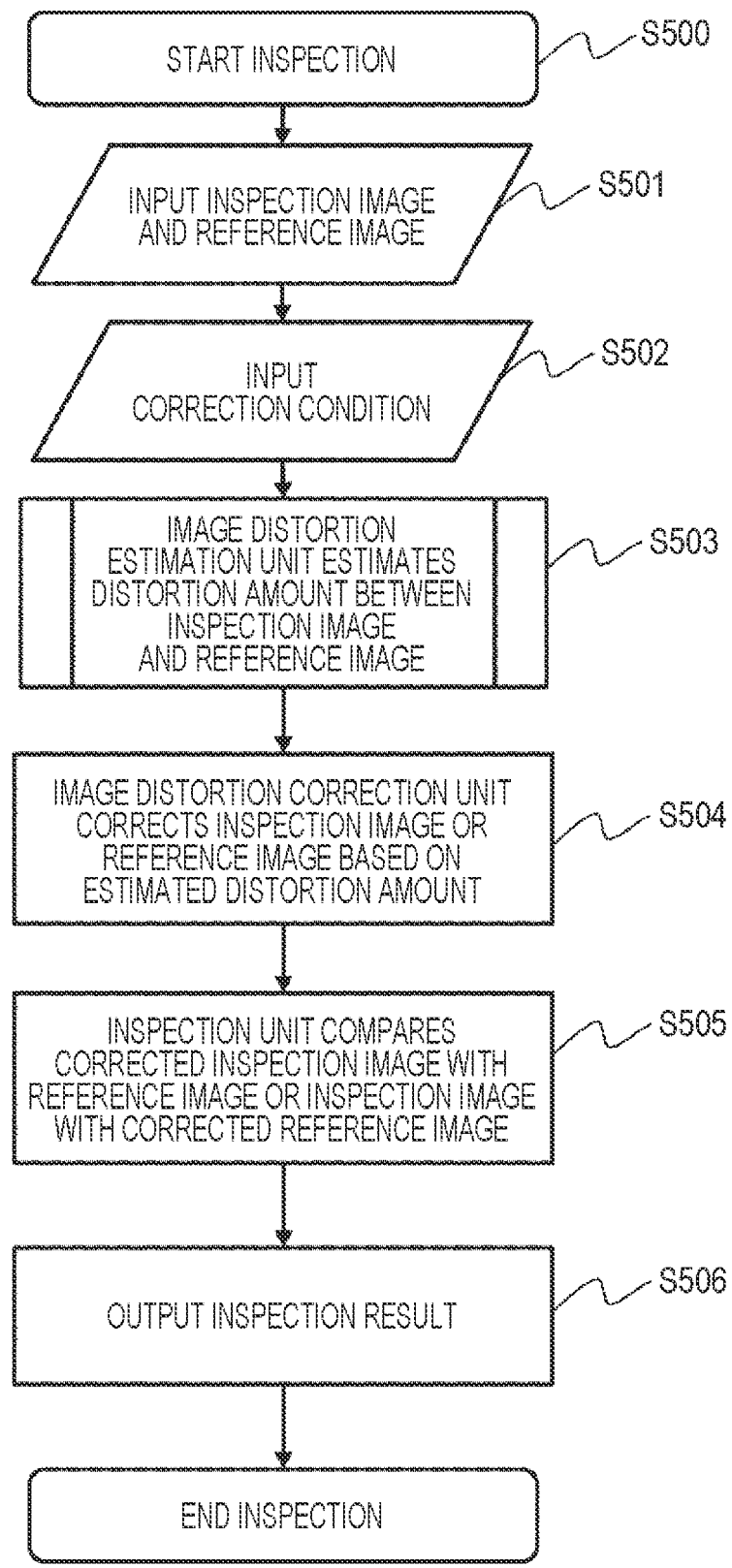
FIG. 5 is a flowchart illustrating processing operation of the inspection apparatus according to the first embodiment.

FIG. 5 is a flowchart illustrating processing operation of the inspection apparatus 301 according to the present embodiment. As illustrated in FIG. 5, in step S501, the inspection image 102 and the reference image 101 are input to the inspection apparatus 301.

In step S502, the correction condition 302 is input to the inspection apparatus 301.

In step S503, the image distortion estimation unit 303 constituting the inspection apparatus 301 estimates the distortion amount between the reference image 101 and the inspection image 102 using the reference image 101, the inspection image 102, and the correction condition 302 that have been input, and outputs the estimated distortion amount 304. The estimated distortion amount 304 having been output is stored in a storage unit. Details of step S503 of the present embodiment will be described later with reference to FIG. 6.

In step S504, the image distortion correction unit 305 constituting the inspection apparatus 301 corrects the inspection image 102 or the reference image 101 using the estimated distortion amount output by the image distortion estimation unit 303, and outputs the corrected inspection image 306 or the corrected reference image not illustrated. The corrected inspection image 306 having been output or the corrected reference image not illustrated is stored in the storage unit.

In step S505, the inspection unit 307 constituting the inspection apparatus 301 compares the corrected inspection image 306 with the reference image 101 or the inspection image 102 with the corrected reference image (not illustrated) to calculate the presence or absence and the coordinates of an abnormal portion such as a defect.

In step S506, the inspection unit 307 constituting the inspection apparatus 301 outputs an inspection result 308 calculated by the inspection unit 307, and ends the inspection.

Figure 6:
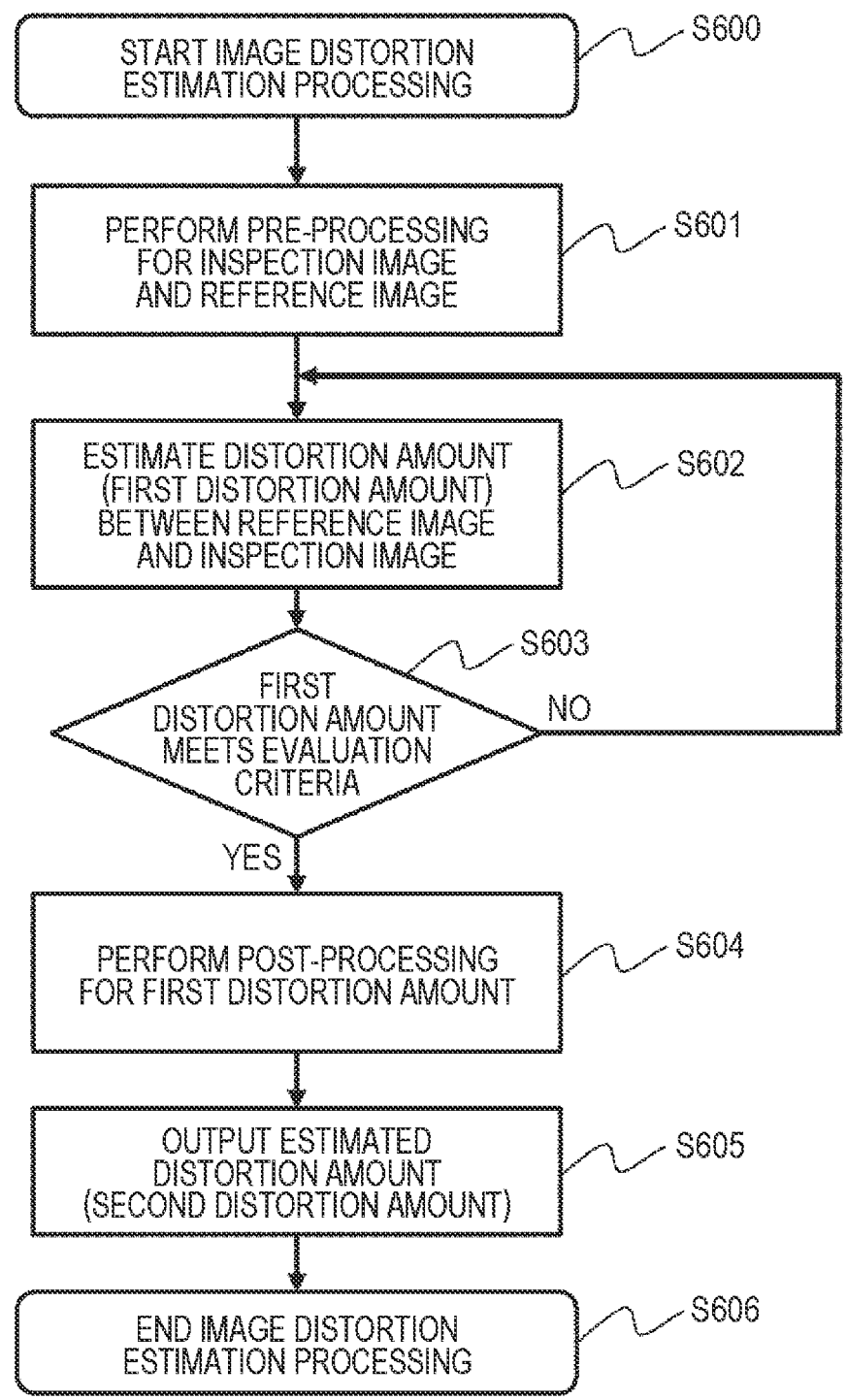
FIG. 6 is a flowchart of an image distortion estimation unit constituting the inspection apparatus according to the first embodiment.

FIG. 6 is a flowchart of the image distortion estimation unit 303 constituting the inspection apparatus 301 according to the present embodiment.

As illustrated in FIG. 6, in step S601, the image distortion estimation unit 303 constituting the inspection apparatus 301 performs image pre-processing defined in the correction condition 302 on the inspection image 102 and the reference image 101 that have been input in step S501 described above.

In step S602, by using the inspection image and the reference image subjected to the pre-processing in step S602, the image distortion estimation unit 303 estimates a shift amount that increases the similarity between the inspection image and the reference image, and outputs a positional displacement (first distortion amount) due to image distortion between the reference image and the inspection image. Estimation methods include a method of setting an initial value of an arbitrary or random distortion amount and updating the distortion amount according to an evaluation value in step S603 described later. More specifically, estimation methods include a method in which for a reference image R, an inspection image I, a correction processing function f, an estimated distortion amount D, and a distance function d, a constrained optimization problem that minimizes the evaluation value calculated by the evaluation function d(R, f(I, D)) is solved by dynamic programming or the like using a constraint condition L designated by the correction condition 302. The distance function d evaluates image similarity between the reference image and the inspection image, and includes an absolute error and a square error. If the reference image is an image statistic such as a Gaussian distribution that can be taken by the luminance value of the inspection image, the negative log likelihood is included.

In step S603, the image distortion estimation unit 303 evaluates the first distortion amount estimated in step S602, and determines whether the evaluation value satisfies the evaluation criteria. The evaluation values include a value related to variation such as a difference or variance in the vector amount in a region near the estimated distortion amount, and an image similarity between an image obtained by correcting the inspection image using the estimated distortion amount and the reference image. The evaluation criteria include whether or not the constraint conditions for variations such as a difference and a variance in the region near the estimated distortion amount designated by the correction condition 302 are satisfied, and whether or not the image similarity is equal to or greater than the designated one.

In step S604, the image distortion estimation unit 303 performs post-processing defined in the correction condition 302 on the first distortion amount and outputs a second distortion amount.

In step S605, the image distortion estimation unit 303 outputs the second distortion amount as the estimated distortion amount, and ends the image distortion estimation processing.

Figure 2A:
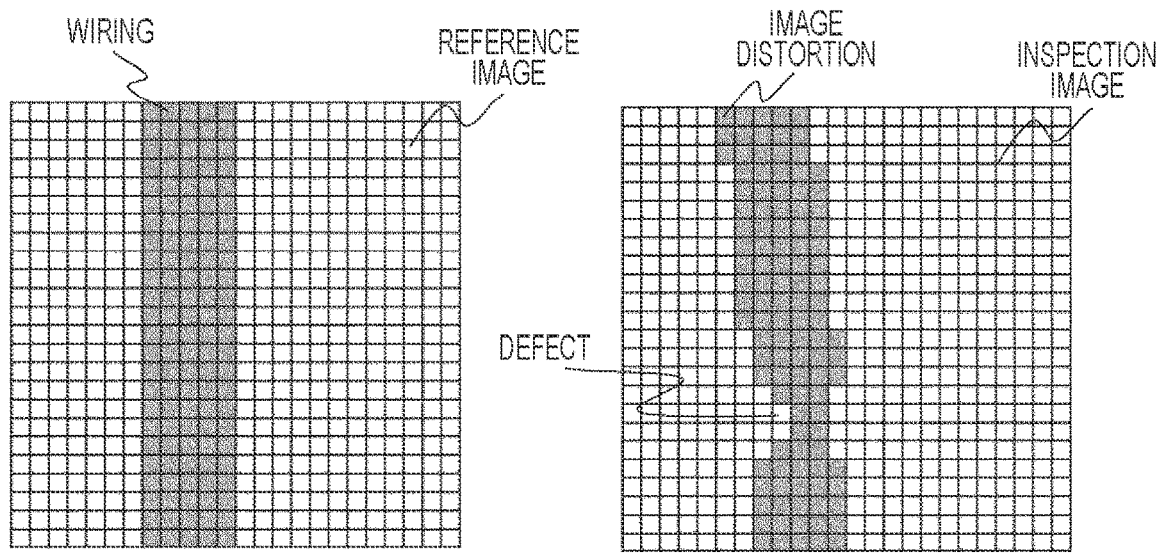
FIG. 2A is a diagram illustrating positional displacement due to a reference image and image distortion, and an inspection image having a defect.
Figure 2B:
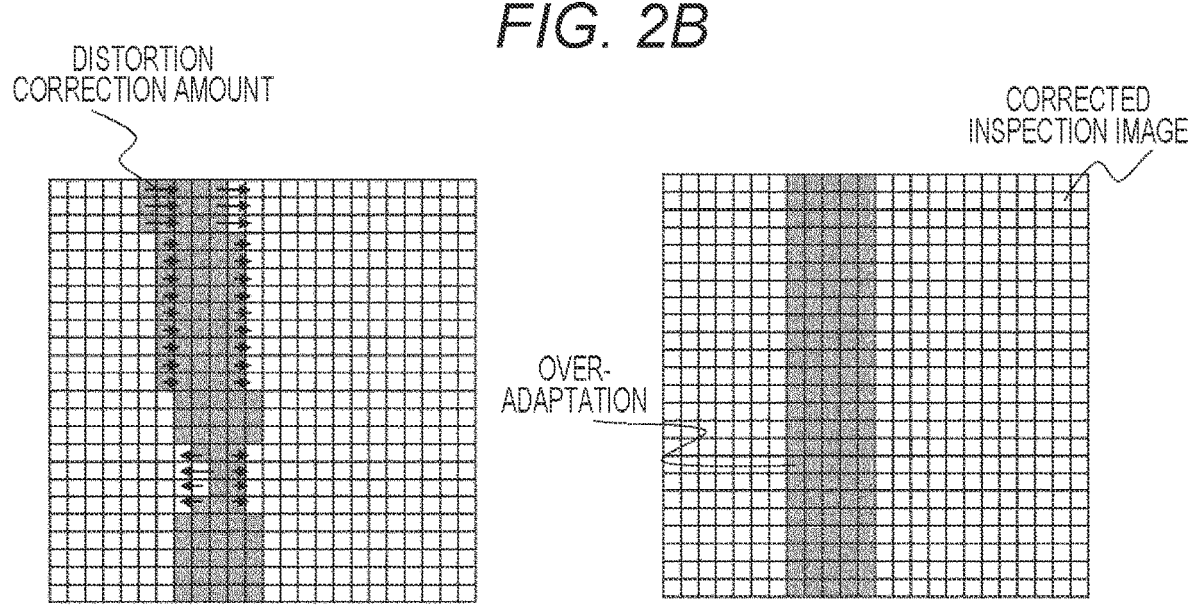
FIG. 2B is a diagram illustrating a distortion correction amount and a corrected inspection image in which overadaptation with respect to a defect portion occurs.
Figure 2C:
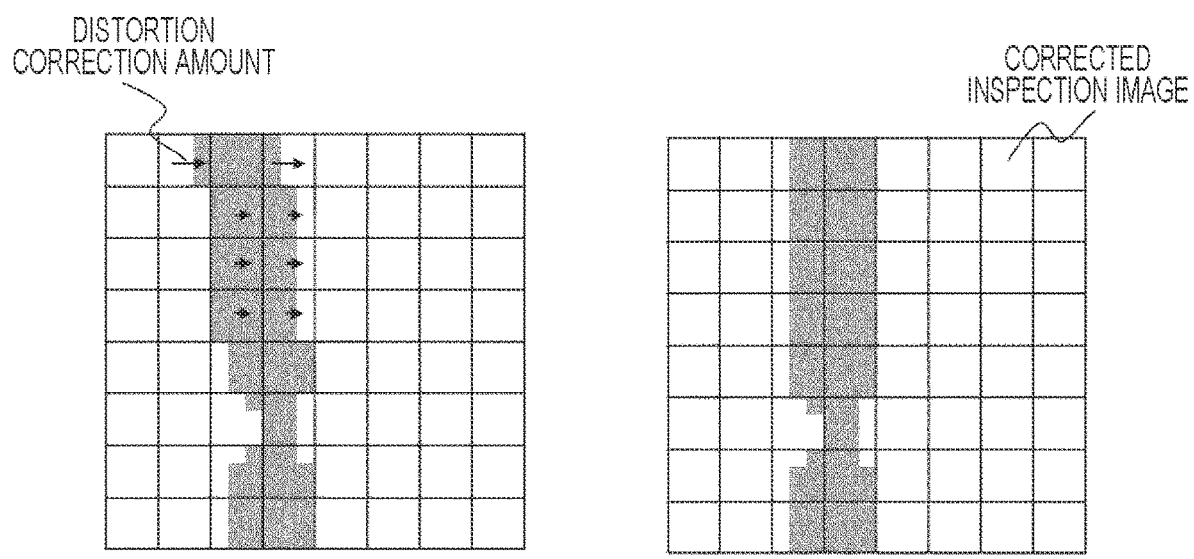
FIG. 2C is a diagram illustrating a distortion correction amount based on a distortion amount estimated by an image distortion estimation unit constituting an inspection apparatus according to one embodiment of the present invention, and a corrected inspection image.

Effects by the present embodiment will be described with reference to FIGS. 2A, 2B, and 2C. FIG. 2A is a diagram illustrating positional displacement due to a reference image and image distortion, and an inspection image having a defect. FIG. 2B is a diagram illustrating a distortion correction amount and a corrected inspection image in which over-adaptation with respect to a defect portion occurs. FIG. 2C is a diagram illustrating the distortion correction amount based on the distortion amount estimated by the present embodiment and a corrected inspection image.

As in the inspection image of FIG. 2A, an abnormal portion such as a defect appears on the inspection image as a local and high-frequency image feature compared to image distortion.

In a case of using the method described in JP 4239088 B2, the image distortion amount is estimated so as to maximize the similarity between the inspection image and the reference image, whereby the distortion correction amount is estimated for each corresponding pixel of the inspection image as illustrated in FIG. 2B, and the corrected inspection image coincides with the reference image. As a result, it leads to undetection in which the abnormal portion such as a defect is determined to be normal.

On the other hand, in the present embodiment, by adjusting the upsample magnification and downsample magnification as correction conditions and the filter size and parameters of the smoothing filter that smooths the inspection image and the reference image, it is possible to prevent the image distortion estimation unit from being able to estimate the distortion amount on the basis of the local image variation due to the defect on the inspection image, and it is possible to estimate only the image distortion that is the variation occurring over the entire image.

By adjusting the filter size and parameters of the smoothing filter that smooths the estimated distortion amount and suppressing the difference in the predicted distortion amount in the adjacent region as a constraint condition on the evaluation criteria in step S603, it is possible to reduce the variation of the distortion amount in the region near the estimated distortion amount and suppress the high-frequency correction amount that causes the defect to be undetected.

Due to these, in the present embodiment, as illustrated in FIG. 2C, by not estimating the local and high-frequency correction amount, it is possible to generate a corrected inspection image in which a defect portion remains. Therefore, it is possible to secure the accuracy of the inspection apparatus with respect to the inspection image having positional displacement due to image distortion.

In the present embodiment, an example in which the image distortion of the inspection image is removed with the inspection image 102 as an input to the image distortion correction unit 305 has been described in FIG. 3, but a configuration may be employed in which the reference image 101 is input to the image distortion correction unit 305 and one with an added image distortion is output as the corrected reference image.

As described above, according to the present embodiment, it is possible to provide an inspection apparatus capable of improving the accuracy of evaluation and measurement by a distortion correction technique adapted to a region excluding an abnormal portion such as a defect in evaluation such as defect inspection and dimension measurement.

Specifically, by adjusting the upsample magnification and downsample magnification as correction conditions and the filter size and parameters of the smoothing filter that smooths the inspection image and the reference image, it is possible to prevent the image distortion estimation unit from being able to estimate the distortion amount on the basis of the local image variation due to the defect on the inspection image, and it is possible to estimate only the image distortion that is the variation occurring over the entire image.

By not estimating the local and high-frequency correction amount, it is possible to generate a corrected inspection image in which a defect portion remains. Therefore, it is possible to secure the accuracy of the inspection apparatus with respect to the inspection image having positional displacement due to image distortion.

Second Embodiment

Figure 7:
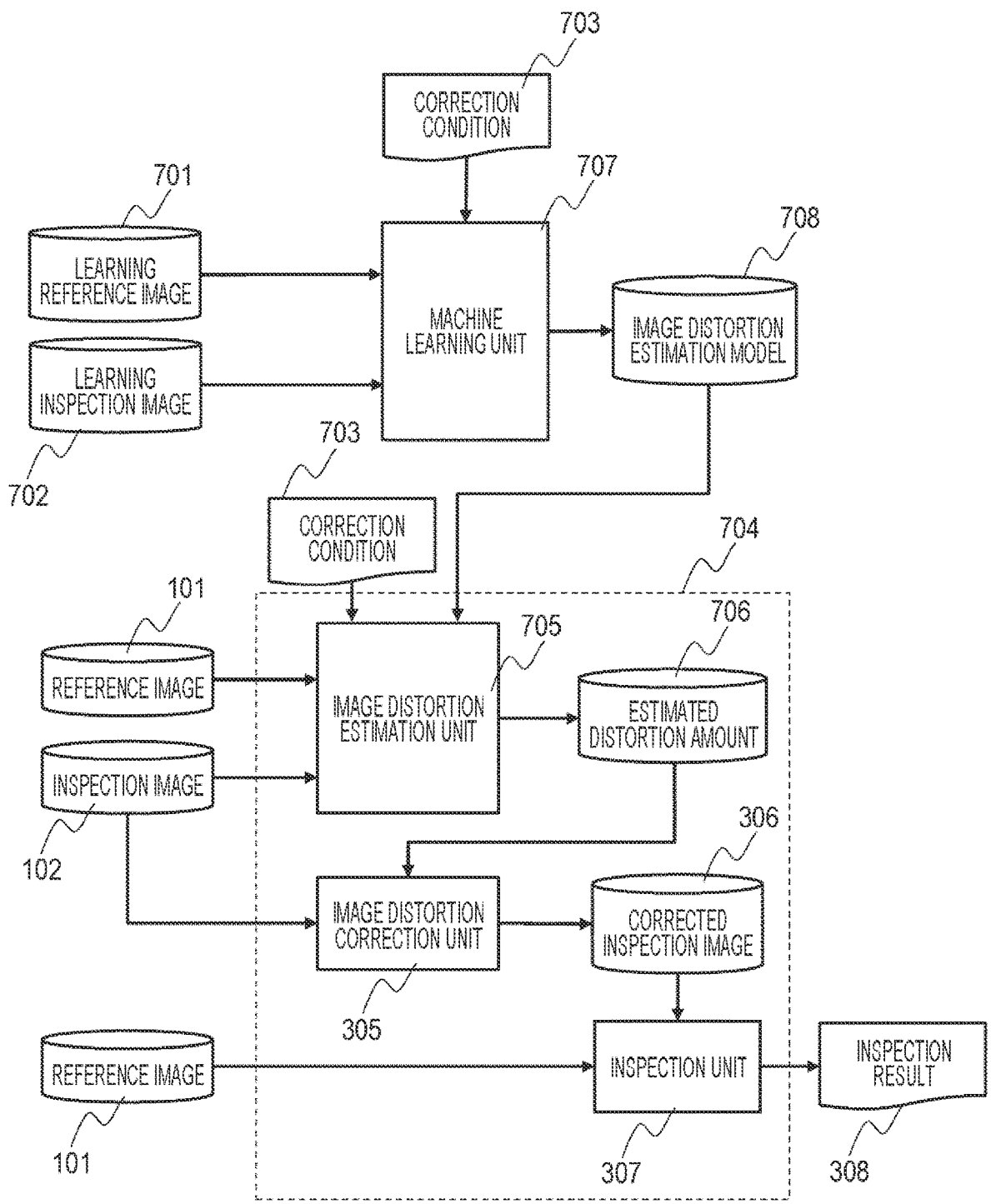
FIG. 7 is a functional block diagram illustrating an overall configuration example of an inspection apparatus of a second embodiment according to another embodiment of the present invention.

FIG. 7 is a functional block diagram illustrating an overall configuration example of the inspection apparatus of the second embodiment according to another embodiment of the present invention. An inspection apparatus 704 according to the present embodiment corresponds to the inspection apparatus 301 in the first embodiment described above, but is different from the first embodiment in that the positional displacement due to the image distortion between the reference image and the inspection image is estimated using an image distortion estimation model generated by machine learning in step S503 illustrated in FIG. 5. The same components as those in the first embodiment are denoted by the same reference numerals, and the description overlapping those in the first embodiment will be omitted below.

As illustrated in FIG. 7, the inspection apparatus 704 according to the present embodiment includes an image distortion estimation unit 705, an estimated distortion amount 706, the image distortion correction unit 305, the corrected inspection image 306, and the inspection unit 307. Here, the image distortion estimation unit 705, the image distortion correction unit 305, and the inspection unit 307 are implemented by, for example, a processor such as a CPU (not illustrated), a ROM that stores various programs, a RAM that temporarily enables data in an arithmetic process, and a storage apparatus such as an external storage apparatus, and the processor such as the CPU reads and executes the various programs stored in the ROM, and stores an arithmetic result that is an execution result into the RAM or the external storage apparatus.

Note that the image distortion correction unit 305 and the inspection unit 307 are similar to those in the first embodiment. In addition, a machine learning unit 707 for creating an image distortion estimation model 708 used by the image distortion estimation unit 705 is included. The processing flow of the inspection apparatus 704 is similar to that of the first embodiment illustrated in FIG. 5, but is different in content of step S503. Only differences from the first embodiment will be described later.

The image distortion estimation unit 705 constituting the inspection apparatus 704 receives the reference image 101, the inspection image 102, and a correction condition 703, estimates the positional displacement due to the image distortion between the reference image 101 and the inspection image 102 using the image distortion estimation model 708 created by the machine learning unit 707 described later, and outputs the estimated distortion amount 706. The image distortion estimation model 708 is learned such that the similarity between the reference image 101 and the inspection image 102 increases while the estimated distortion amount 706 satisfies the constraint condition defined by the correction condition 703 described later.

The machine learning unit 707 creates and stores the image distortion estimation model 708 used by the image distortion estimation unit 705 using a learning reference image 701, a learning inspection image 702, and the correction condition 703. The learning processing in the machine learning unit 707 may be performed simultaneously with the processing in the inspection apparatus 704 or may be individually performed. When a computer that executes the image distortion estimation unit 705 can acquire the image distortion estimation model 708 via network connection or the like, the machine learning unit 707 may be configured to be executed by a computer different from that for the inspection processing 704.

When the image distortion correction unit 305 corrects the reference image 101 or the inspection image 102, the image distortion estimation model 708 is learned so as to increase the similarity between the reference image 101 and the inspection image 102 while satisfying the constraint condition defined by the correction condition 703 described later. For the image distortion estimation model 708, for example, an encode-decoder type convolution neural network (CNN) such as U-Net or a CNN having another structure is used, but the image distortion estimation model is not limited to CNN.

Figure 8:
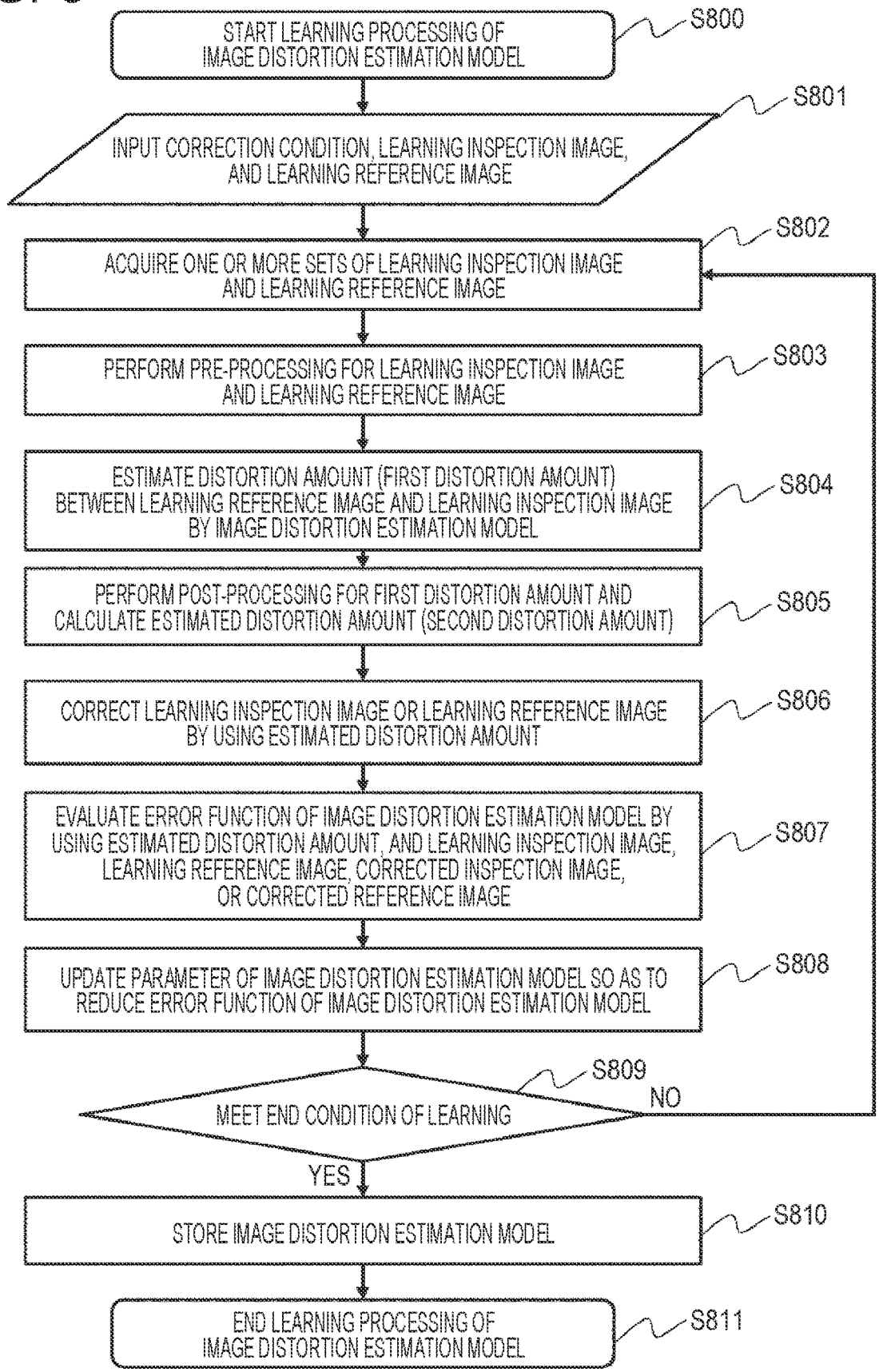
FIG. 8 is a flowchart of a machine learning unit illustrated in FIG. 7.

FIG. 8 is a flowchart for explaining the operation of the machine learning unit 707 according to the present embodiment. As illustrated in FIG. 8, in step S801, the learning reference image 701, the learning inspection image 702, and the correction condition 703 are input to the machine learning unit 707. The learning reference image 701 and the learning inspection image 702 are a set of a reference image and an inspection image having a positional displacement due to image distortion between two images, and one or more sets are input to the machine learning unit 707. As the correction condition 703, a weighting parameter and the like in calculation of an error function in step S806 described later are defined in addition to the same content as the correction condition 302 of the first embodiment described above.

In step S802, the machine learning unit 707 acquires one or more sets from the learning inspection image 702 and learning reference image 701 that have been input.

In step S803, on the basis of the processing content and the setting parameters defined in the correction condition 703, the machine learning unit 707 performs pre-processing similar to that in step S601 in the image distortion estimation unit 303 of the above-described the first embodiment on the learning inspection image 702 and the learning reference image 701 acquired in step S802.

In step S804, the machine learning unit 707 estimates the distortion amount (first distortion amount) between the reference image and the inspection image using the learning reference image and the learning inspection image processed in step S803 using the image distortion estimation model 708. In the present embodiment, the image distortion estimation model 708 that estimates the first distortion amount using the reference image and the inspection image pre-processed in step S803 as inputs will be described. For example, in a case where the reference image is an image simulated by a machine learning model such as CNN, the feature amount of an intermediate layer of a reference image generation model can be input to the image distortion estimation model 708 simultaneously with the reference image or as a substitute for the reference image.

In step S805, the machine learning unit 707 performs post-processing similar to that in step S604 in the image distortion estimation unit 303 of the first embodiment described above on the basis of the processing content and the setting parameter defined in the correction condition 703, and calculates the estimated distortion amount (second distortion amount).

In step S806, the machine learning unit 707 corrects the inspection image or the reference image using the estimated distortion amount (second distortion amount) and creates a corrected inspection image or a corrected reference image.

In step S807, the machine learning unit 707 evaluates the error function or the loss function of the image distortion estimation model 708 using the estimated distortion amount calculated in step S805, the learning inspection image and the learning reference image 701 acquired in step S802, and the corrected inspection image or the corrected reference image created from the learning inspection image 702 and the learning reference image 701 in step S806. The error function or the loss function of the image distortion estimation model 708 is, for example, a weighted sum of an evaluation value indicating a variation such as a difference or a variance in the magnitude of the vector in the region near the estimated distortion amount defined by the correction condition 703 and an absolute error, a square error, or a negative log likelihood of a Gaussian distribution between the corrected inspection image and the learning reference image, and the weighting parameter is defined as the correction condition 703. The regularization term related to the estimated distortion amount is, for example, when the estimated distortion amount is in an image format, an average of differences in magnitude of the vector of the estimated distortion amount between adjacent pixels, a variance of the estimated distortion amount near a specific pixel, and the like.

In step S808, the machine learning unit 707 updates the parameter of the image distortion estimation model 708 so as to reduce the value of the error function of the image distortion estimation model 708 on the basis of the evaluation result in step S807. This update is performed by a stochastic gradient descent method, for example.

In step S809, the machine learning unit 707 determines whether or not the end condition of learning has been reached, and if it determines that the end condition of learning has been reached (YES), the process proceeds to step S810, and the machine learning unit 707 stores the image distortion estimation model 708 and ends the learning processing. On the other hand, if it determines that the end condition of learning has not been reached (NO), the process returns to step S802, and the processing in and after step S802 are executed again. The end conditions of learning include whether the processing from step S802 to step S808 have been repeated equal to or greater than a predetermined number of times, whether the value of the error function of the image distortion estimation model obtained in step S807 does not decrease even when the processing from step S802 to step S808 have been repeated a predetermined number of times and it is determined that the learning of the image distortion estimation model 708 has converged.

Figure 9:
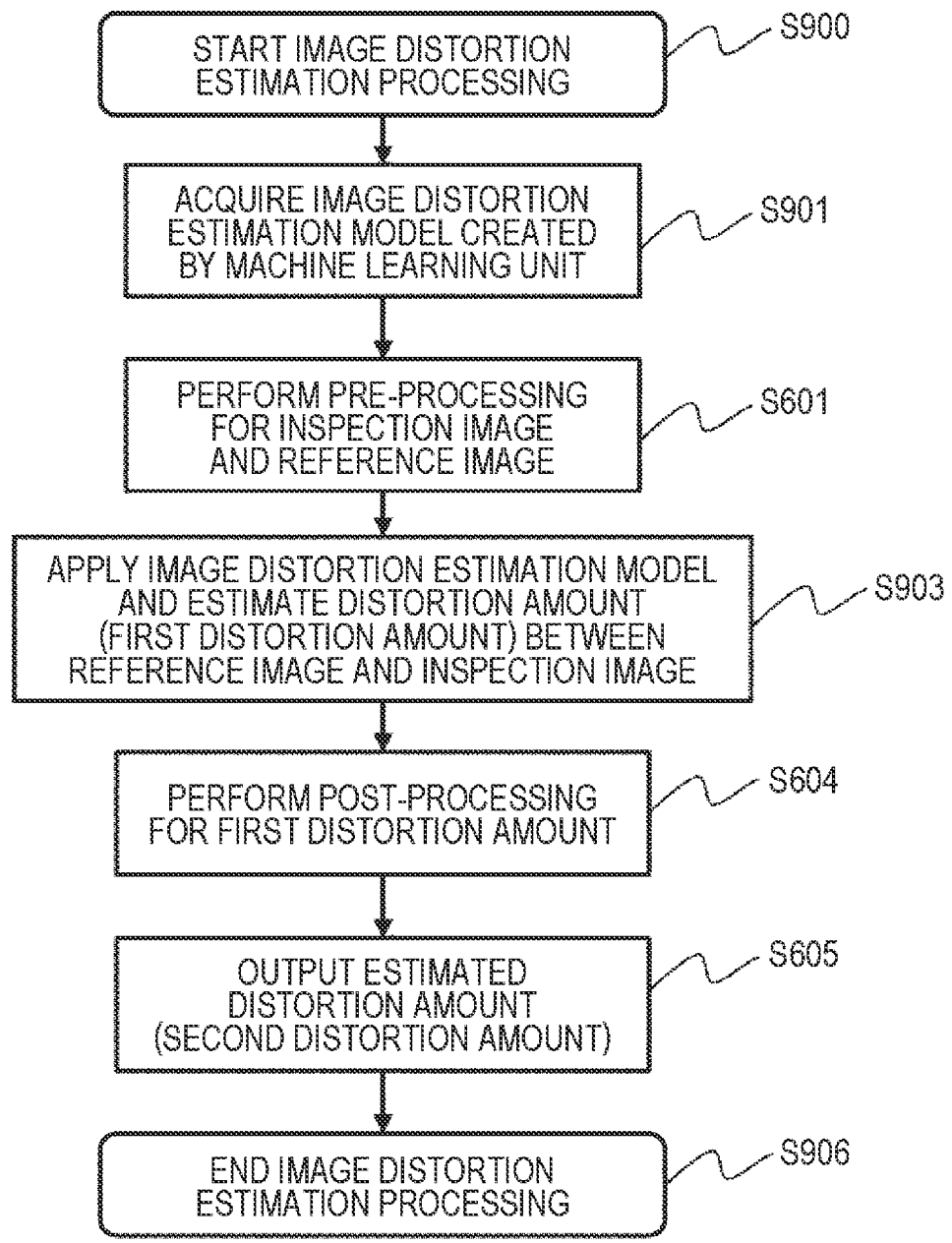
FIG. 9 is a flowchart of an image distortion estimation unit constituting the inspection apparatus according to the second embodiment.

FIG. 9 is a flowchart of the image distortion estimation unit 705 constituting the inspection apparatus 704 according to the present embodiment. Hereinafter, only points different from those in the processing flow of the inspection apparatus 301 of the first embodiment illustrated in FIG. 6 will be described.

In step S901, the image distortion estimation unit 705 constituting the inspection apparatus 704 acquires the image distortion estimation model 708 created by the machine learning unit 707.

In step S903, the image distortion estimation unit 705 applies the image distortion estimation model 708 to the inspection image and the reference image pre-processed in step S601, and estimates the distortion amount (first distortion amount) between the reference image 101 and the inspection image 102.

Thereafter, through steps S604 and S605, the estimated distortion amount is output, and the image distortion estimation processing ends.

In the case of using machine learning in this manner, there is an advantage that by changing the configuration of the image distortion estimation model, it is possible to reduce the memory usage and the arithmetic time of the computer that performs the inspection although it is a trade-off with the estimation accuracy. Methods of reducing the arithmetic time by changing the configuration include reducing the number of channels of the convolution layer used in CNN and reducing the number of layers.

As described above, according to the present embodiment, in addition to the effects of the first embodiment, by changing the configuration of the image distortion estimation model, it is possible to reduce the memory usage and the arithmetic time of the computer that performs the inspection although it is a trade-off with the estimation accuracy.

Third Embodiment

Figure 11:
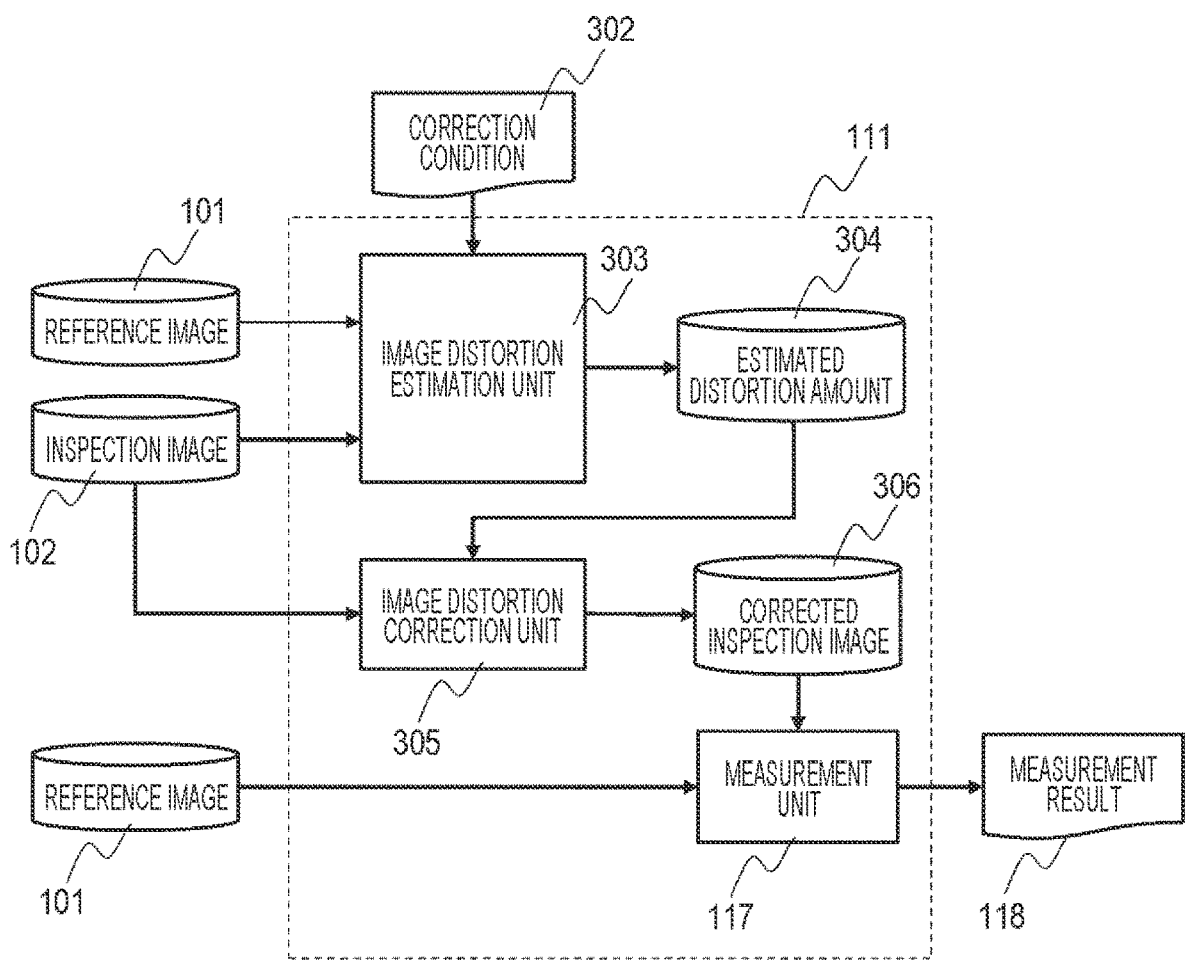
FIG. 11 is a functional block diagram illustrating an overall configuration example of a measurement apparatus of a third embodiment according to another embodiment of the present invention.

FIG. 11 is a functional block diagram illustrating an overall configuration example of the measurement apparatus of the third embodiment according to another embodiment of the present invention. The present embodiment is different from the first embodiment in that the present embodiment is a measurement apparatus having measurement of the length of a sample using a corrected inspection image. The same components as those in the first embodiment are denoted by the same reference numerals, and the description overlapping those in the first embodiment will be omitted below.

Figure 10A:
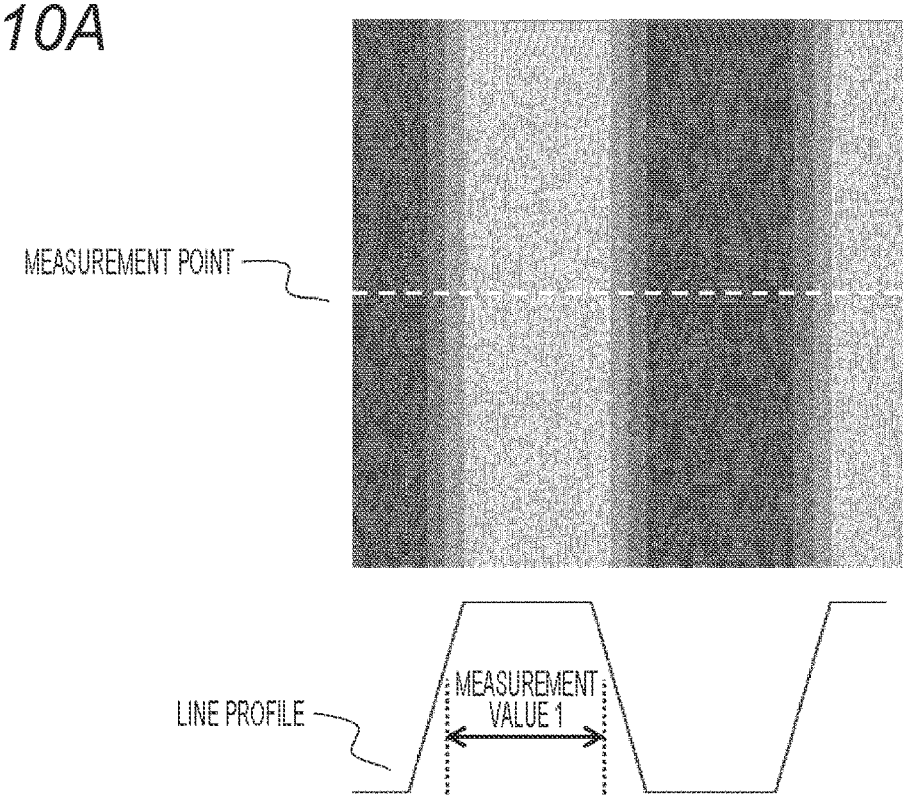
FIG. 10A is a diagram illustrating an example of measuring an image region without image distortion.
Figure 10B:
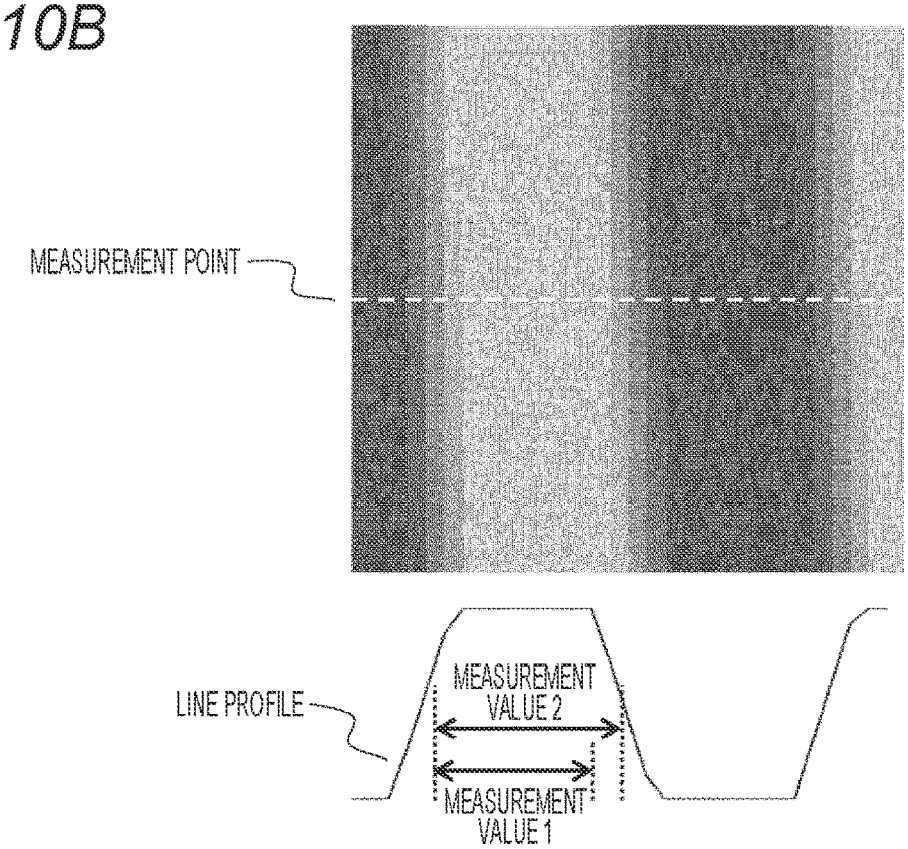
FIG. 10B is a diagram illustrating an example of measuring an image region with image distortion.

Some positional displacement due to image distortion have a feature that the positional displacement increases toward the end of the image as in one due to the radial distortion such as the inspection image 102 exemplified in FIG. 1. In such a case, the sample is deformed on the image due to the positional displacement, and a measurement error increases. FIGS. 10A and 10B illustrate an example of measurement processing, FIG. 10A is a diagram illustrating an example of measuring an image region without image distortion, and FIG. 10B is a diagram illustrating an example of measuring an image region with image distortion. The measurement methods using an image include a method in which, as illustrated in FIG. 10A, a line profile having a luminance value of a measurement point as a height is acquired, and a width of the point having a height designated in a measurement recipe is used as a measurement value. As illustrated in FIG. 10B, in a case of measuring a region having image distortion, an error occurs between a measurement value 2 that is obtained and a measurement value 1 in a region without image distortion due to deformation on the inspection image by image distortion.

As illustrated in FIG. 11, a measurement apparatus 111 according to the present embodiment includes the image distortion estimation unit 303, the estimated distortion amount 304, the image distortion correction unit 305, the corrected inspection image 306, and a measurement unit 117. Here, the image distortion estimation unit 303, the image distortion correction unit 305, and the measurement unit 117 are implemented by, for example, a processor such as a CPU (not illustrated), a ROM that stores various programs, a RAM that temporarily enables data in an arithmetic process, and a storage apparatus such as an external storage apparatus, and the processor such as the CPU reads and executes the various programs stored in the ROM, and stores an arithmetic result that is an execution result into the RAM or the external storage apparatus.

Similarly to the first embodiment described above, when the image distortion estimation unit 303 and the image distortion correction unit 305 operate, a corrected inspection image is obtained, and the measurement unit 117 constituting the measurement apparatus 111 measures the length of the sample using the corrected inspection image having been obtained.

A configuration of estimating the positional displacement due to image distortion between the reference image and the inspection image using the image distortion estimation model generated by the machine learning described in the second embodiment described above may be added.

When the local positional displacement is corrected, measurement at a point having deformation due to a factor other than image distortion such as a defect is not correctly executed. However, according to the present embodiment, by estimating only image distortion that is a variation occurring over the entire image and correcting the inspection image, it is possible to reduce only the measurement error due to image distortion.

As described above, according to the present embodiment, it is possible to provide a measurement apparatus capable of improving the accuracy of measurement by a distortion correction technique adapted to a region excluding an abnormal portion such as a defect in dimension measurement.

Specifically, by adjusting the upsample magnification and downsample magnification as correction conditions and the filter size and parameters of the smoothing filter that smooths the inspection image and the reference image, it is possible to prevent the image distortion estimation unit from being able to estimate the distortion amount on the basis of the local image variation due to the defect on the inspection image, and it is possible to estimate only the image distortion that is the variation occurring over the entire image.

By not estimating the local and high-frequency correction amount, it is possible to generate a corrected inspection image in which a defect portion remains. Therefore, it is possible to secure the accuracy of the measurement apparatus with respect to the inspection image having positional displacement due to image distortion.

Furthermore, by changing the configuration of the image distortion estimation model, it is possible to reduce the memory usage and the arithmetic time of the computer that performs the inspection although it is a trade-off with the estimation accuracy.

The present invention is not limited to the embodiments described above, and includes various modifications. For example, the embodiments described above have been described in detail for the purpose of describing the present invention in an easy-to-understand manner, and are not necessarily limited to those having all the configurations described above. A part of the configuration of a certain embodiment can be replaced by the configuration of other embodiments, and the configuration of other embodiments can be added to the configuration of a certain embodiment.

What is claimed is:

1. An inspection apparatus that inspects an inspection image by comparison with a reference image, the inspection apparatus comprising:
    an image distortion estimation unit that estimates a distortion amount between the reference image and the inspection image;
    an image distortion correction unit that corrects an inspection image and/or a reference image using an estimated distortion amount; and
    an inspection unit that performs inspection using a corrected inspection image and a reference image or an inspection image and a corrected reference image,
    wherein the image distortion estimation unit estimates a distortion amount in which only distortion occurring in an entire image can be corrected by adjustment of a correction condition.

2. The inspection apparatus according to claim 1, wherein the image distortion estimation unit
    estimates a first distortion amount by using, pre-processing on an inspection image and a reference image, processing content of which can be changed based on a correction condition, and an inspection image and a reference image processed by the pre-processing as inputs, and
    performs post-processing defined in a correction condition on the first distortion amount, and sets a second distortion amount as the estimated distortion amount.

3. The inspection apparatus according to claim 2, wherein
    at least pre-processing defined in a correction condition is downsample processing for reducing image sizes of an inspection image and a reference image, and the post-processing is upsample processing for processing an estimated distortion amount into a form that can be input to an image distortion correction unit, and
    by adjusting magnification of the downsample processing and the upsample processing and/or a filter size of a smoothing filter that smooths an inspection image and a reference image as correction conditions, the image distortion estimation unit estimates a distortion amount except for a local and high-frequency image feature.

4. The inspection apparatus according to claim 2, wherein the image distortion estimation unit includes processing of evaluating similarity between an inspection image and a reference image and a variation in distortion amount in a region near the first distortion amount, and estimates a distortion amount to reduce a variation in distortion amount in a region near the estimated distortion amount while increasing similarity between an inspection image and a reference image based on a correction condition.

5. The inspection apparatus according to claim 1, comprising a machine learning unit that creates a model for estimating a distortion amount between the reference image and the inspection image by using a learning inspection image and a learning reference image corresponding to the learning inspection image as a teacher,
    wherein the image distortion estimation unit estimates a distortion amount using a model created by the machine learning unit.

6. The inspection apparatus according to claim 5, wherein the image distortion estimation unit
    estimates a first distortion amount from pre-processing on an inspection image and a reference image, processing content of which can be changed based on a correction condition, and an inspection image and a reference image processed by the pre-processing by using a model created by the machine learning unit, and
    performs post-processing defined in a correction condition on the first distortion amount, and sets a second distortion amount as the estimated distortion amount.

7. The inspection apparatus according to claim 6, wherein
    at least pre-processing defined in a correction condition is downsample processing for reducing image sizes of an inspection image and a reference image, and the post-processing is upsample processing for processing an estimated distortion amount into a form that can be input to an image distortion correction unit, and
    by adjusting magnification of the downsample processing and the upsample processing and/or a filter size of a smoothing filter that smooths an inspection image and a reference image as correction conditions, the image distortion estimation unit estimates a distortion amount except for a local and high-frequency image feature.

8. A measurement apparatus that measures a length of a sample using an inspection image, the measurement apparatus comprising:
    an image distortion estimation unit that estimates a distortion amount between a reference image and the inspection image based on the reference image and the inspection image;
    an image distortion correction unit that corrects an inspection image using an estimated distortion amount; and
    a measurement unit that measures a length of a sample using a corrected inspection image,
    wherein the image distortion estimation unit estimates a distortion amount in which only distortion occurring in an entire image can be corrected by adjustment of a correction condition.

9. The measurement apparatus according to claim 8, wherein
    the image distortion estimation unit
    estimates a first distortion amount by using, pre-processing on an inspection image and a reference image, processing content of which can be changed based on a correction condition, and an inspection image and a reference image processed by the pre-processing as inputs, and
    performs post-processing defined in a correction condition on the first distortion amount, and sets a second distortion amount as the estimated distortion amount.

10. The measurement apparatus according to claim 9, wherein
    at least pre-processing defined in a correction condition is downsample processing for reducing image sizes of an inspection image and a reference image, and the post-processing is upsample processing for processing an estimated distortion amount into a form that can be input to an image distortion correction unit, and
    by adjusting magnification of the downsample processing and the upsample processing and/or a filter size of a smoothing filter that smooths an inspection image and a reference image as correction conditions, the image distortion estimation unit estimates a distortion amount except for a local and high-frequency image feature.

11. The measurement apparatus according to claim 9, wherein the image distortion estimation unit includes processing of evaluating similarity between an inspection image and a reference image and a variation in distortion amount in a region near the first distortion amount, and estimates a distortion amount to reduce a variation in distortion amount in a region near the estimated distortion amount while increasing similarity between an inspection image and a reference image based on a correction condition.

12. The measurement apparatus according to claim 8, comprising a machine learning unit that creates a model for estimating a distortion amount between the reference image and the inspection image by using a learning inspection image and a learning reference image corresponding to the learning inspection image as a teacher,
wherein the image distortion estimation unit estimates a distortion amount using a model created by the machine learning unit.

13. The measurement apparatus according to claim 12, wherein
the image distortion estimation unit
estimates a first distortion amount from pre-processing on an inspection image and a reference image, processing content of which can be changed based on a correction condition, and an inspection image and a reference image processed by the pre-processing by using a model created by the machine learning unit, and
performs post-processing defined in a correction condition on the first distortion amount, and sets a second distortion amount as the estimated distortion amount.

14. The measurement apparatus according to claim 13, wherein
at least pre-processing defined in a correction condition is downsample processing for reducing image sizes of an inspection image and a reference image, and the post-processing is upsample processing for processing an estimated distortion amount into a form that can be input to an image distortion correction unit, and
by adjusting magnification of the downsample processing and the upsample processing and/or a filter size of a smoothing filter that smooths an inspection image and a reference image as correction conditions, the image distortion estimation unit estimates a distortion amount except for a local and high-frequency image feature.

\* \* \* \* \*